US009083982B2

(12) United States Patent
Kitamura

(10) Patent No.: US 9,083,982 B2
(45) Date of Patent: Jul. 14, 2015

(54) IMAGE COMBINING AND ENCODING METHOD, IMAGE COMBINING AND ENCODING DEVICE, AND IMAGING SYSTEM

(75) Inventor: Shinji Kitamura, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1269 days.

(21) Appl. No.: 12/917,192

(22) Filed: Nov. 1, 2010

(65) Prior Publication Data

US 2011/0051816 A1 Mar. 3, 2011

Related U.S. Application Data

(63) Continuation of application No. PCT/JP2009/000278, filed on Jan. 26, 2009.

(30) Foreign Application Priority Data

Jul. 23, 2008 (JP) ................. 2008-189818

(51) Int. Cl.
H04N 7/26 (2006.01)
H04N 19/537 (2014.01)
H04N 19/139 (2014.01)
H04N 19/61 (2014.01)
H04N 19/23 (2014.01)

(52) U.S. Cl.
CPC .......... *H04N 19/537* (2014.11); *H04N 19/139* (2014.11); *H04N 19/23* (2014.11); *H04N 19/61* (2014.11)

(58) Field of Classification Search
CPC .......... H04N 19/00151; H04N 19/004; H04N 19/00781; H04N 19/00545; H04N 19/00745; H04N 19/537; H04N 19/139; H04N 19/61; H04N 19/23; G06T 5/001; G06T 5/002
See application file for complete search history.

(56) References Cited

U.S. PATENT DOCUMENTS

| 6,122,314 A * | 9/2000 | Bruls et al. ............... 375/240.12 |
| 6,686,919 B1 | 2/2004 | Kanetaka et al. |
| 8,134,613 B2 * | 3/2012 | Kondo et al. ............... 348/239 |
| 8,368,741 B2 * | 2/2013 | Jelley et al. ............... 348/14.12 |
| 2006/0221253 A1 * | 10/2006 | Kai et al. ............... 348/701 |
| 2008/0002063 A1 * | 1/2008 | Kimura et al. ............... 348/607 |
| 2008/0024619 A1 | 1/2008 | Ono |
| 2008/0063073 A1 * | 3/2008 | Sekiguchi et al. ....... 375/240.16 |
| 2008/0192131 A1 * | 8/2008 | Kim et al. ............... 348/294 |
| 2008/0278606 A9 * | 11/2008 | Aleksic et al. ............... 348/239 |

FOREIGN PATENT DOCUMENTS

| JP | 07-203460 | 8/1995 |
| JP | 07-203460 A | 8/1995 |
| JP | 11-275560 | 10/1999 |

(Continued)

*Primary Examiner* — Christopher S Kelley
*Assistant Examiner* — Maria Vazquez Colon
(74) *Attorney, Agent, or Firm* — McDermott Will & Emery LLP

(57) ABSTRACT

An image combining and encoding method includes steps of combining a current image and a previous image at a predetermined composition ratio on a per block basis, and generating a composite image, and sequentially encoding moving pictures of the composite image generated in the combining step. A reference image generated in the encoding step is used as the previous image in the combining step.

13 Claims, 15 Drawing Sheets

(56) References Cited

FOREIGN PATENT DOCUMENTS

| | | |
|---|---|---|
| JP | 2002-044521 | 2/2002 |
| JP | 2008-021110 | 1/2008 |
| JP | 2008-021110 A | 1/2008 |
| JP | 2008-035028 | 2/2008 |
| JP | 2008-113112 | 5/2008 |
| WO | WO 97/30545 | 8/1997 |

* cited by examiner

Transition in Input Images
FIG.6B Time T1
FIG.6C Time T2 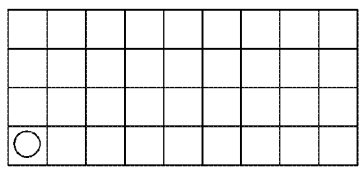
FIG.6D Time T3
FIG.6E Time T4 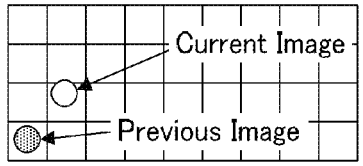
FIG.6F Time T5 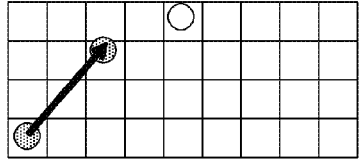
FIG.6G Time T6 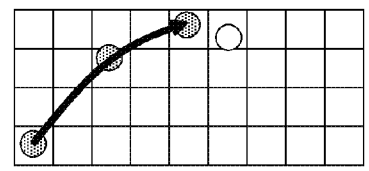
FIG.6H Time T7 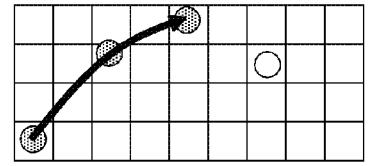
FIG.6I Time T8 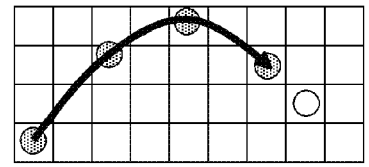
FIG.6J Time T9 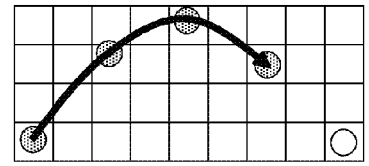

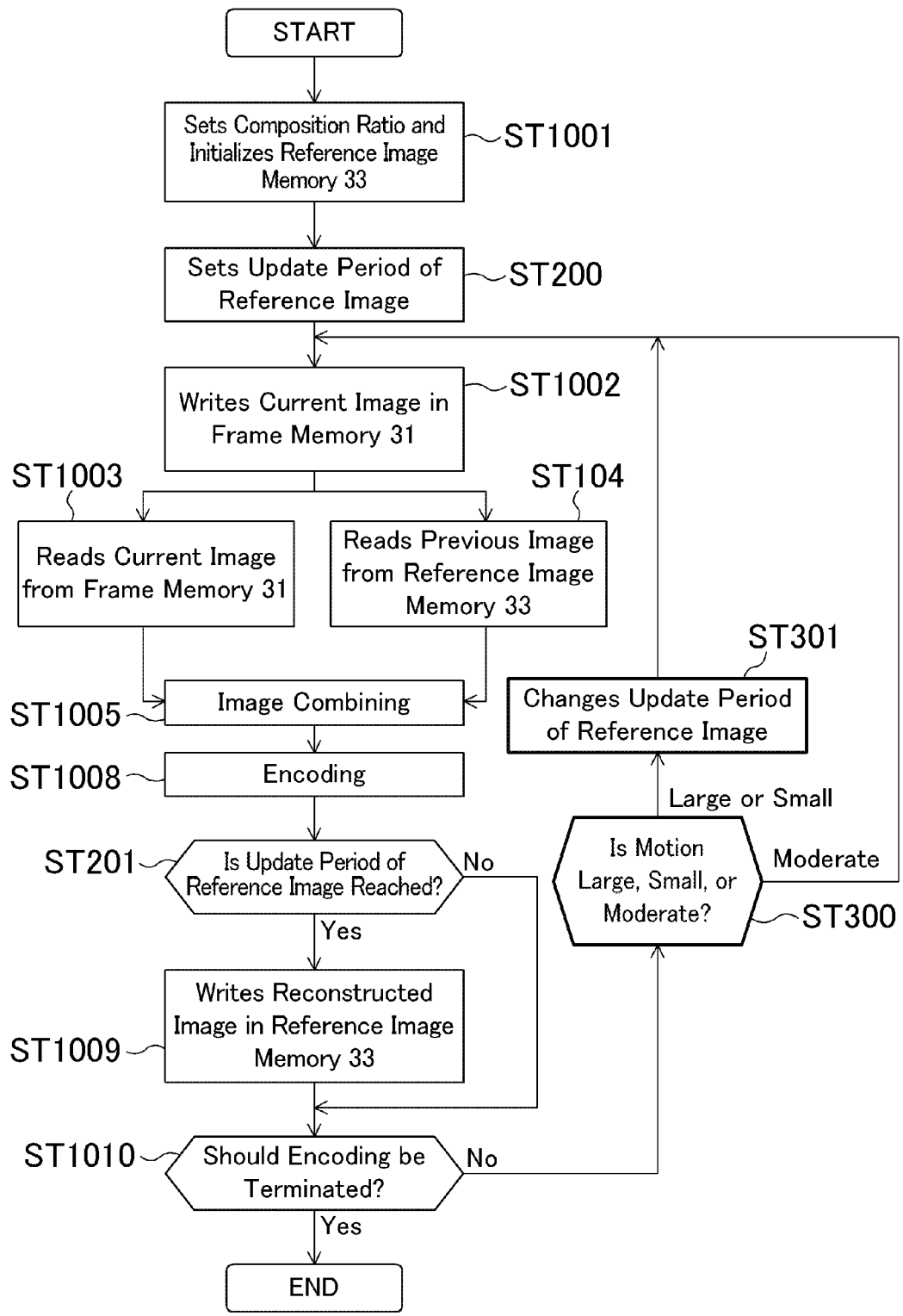

FIG.15A Input Image
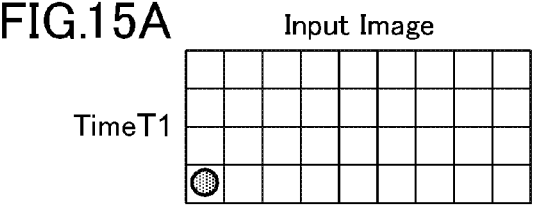
FIG.15B Composite Image
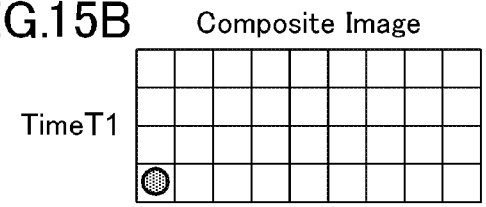
FIG.15C Input Image
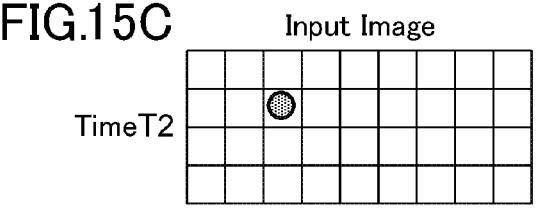
FIG.15D Composite Image
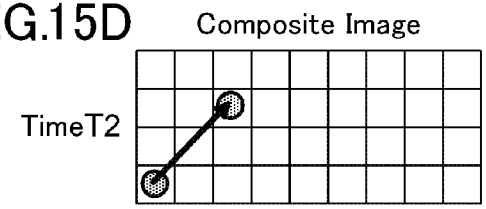
FIG.15E Input Image
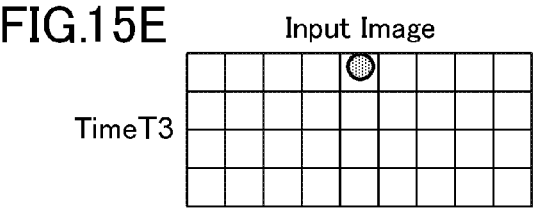
FIG.15F Composite Image
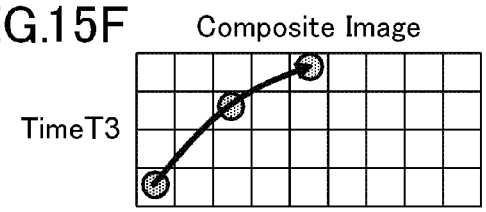
FIG.15G Input Image
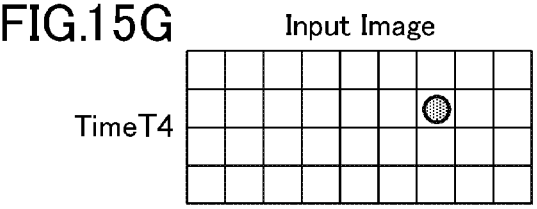
FIG.15H Composite Image
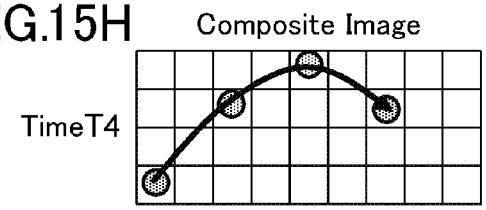
FIG.15I Input Image
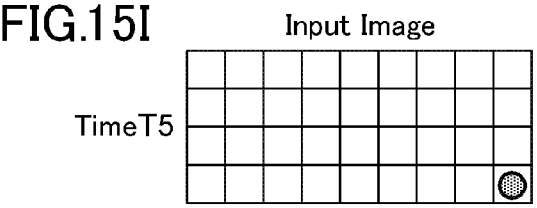
FIG.15J Composite Image
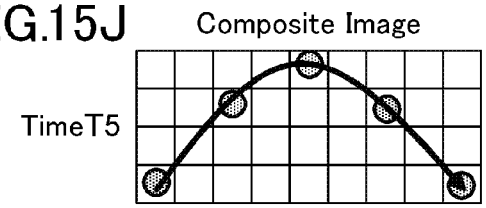

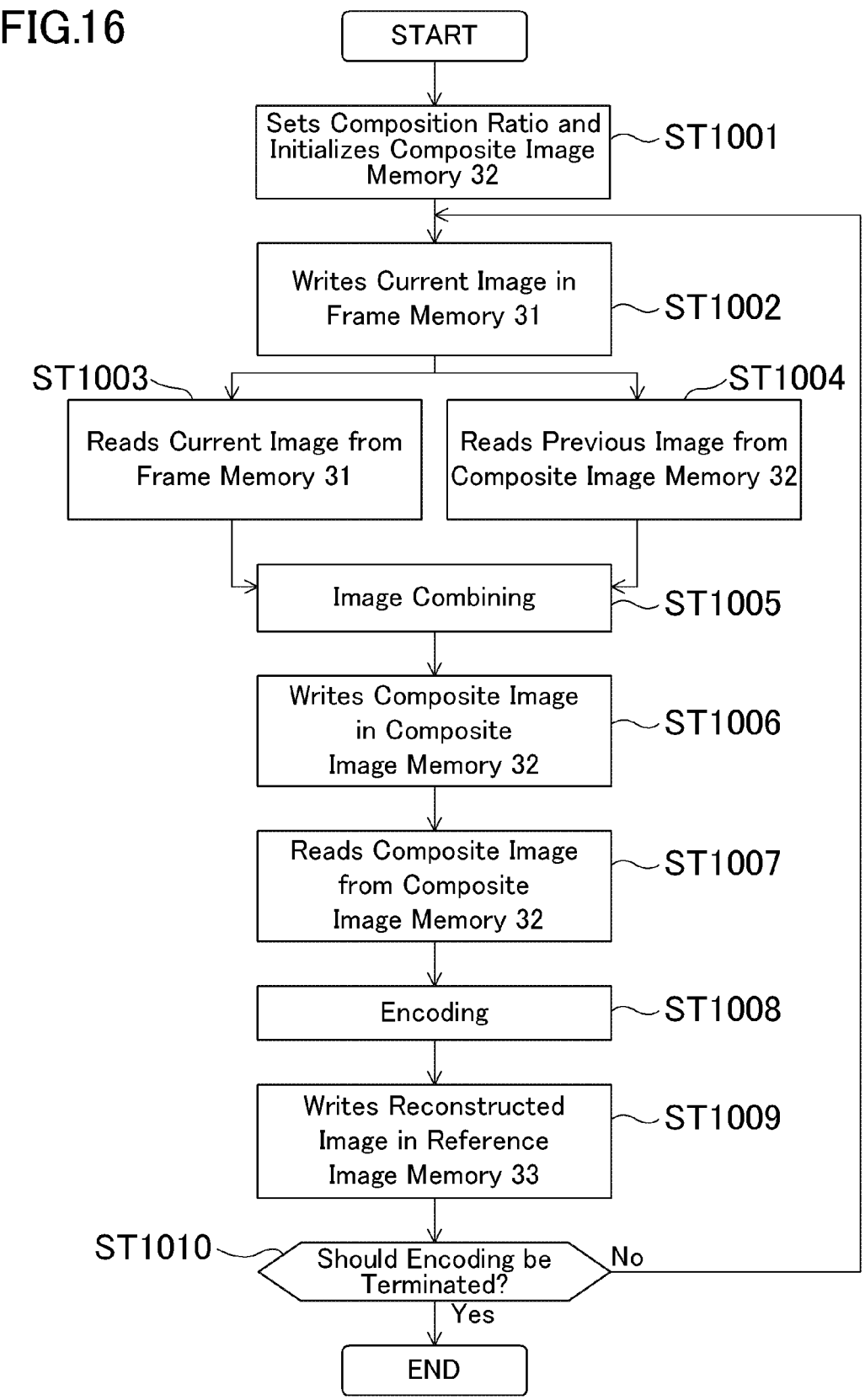

IMAGE COMBINING AND ENCODING METHOD, IMAGE COMBINING AND ENCODING DEVICE, AND IMAGING SYSTEM

CROSS-REFERENCE TO RELATED APPLICATION

This is a continuation of PCT International Application PCT/JP2009/000278 filed on Jan. 26, 2009, which claims priority to Japanese Patent Application No. 2008-189818 filed on Jul. 23, 2008. The disclosures of these applications including the specifications, the drawings, and the claims are hereby incorporated by reference in its entirety.

BACKGROUND

The present invention relates to image combining and encoding methods and devices, as well as imaging systems including these technologies, and more particularly to technologies to sequentially encode a composite image generated by combining a previous image and a current image.

In recent years, technologies for efficiently encoding moving pictures such as MPEG2/4 and H.264 have been actively studied and applied to diverse fields such as computers, communication, consumer audio/video (A/V) devices, and broadcasting. Meanwhile, as high-definition flat panel displays, including plasma displays and liquid crystal display televisions, are rapidly penetrating the market, moving pictures having high-definition television (HDTV) formats have been rapidly becoming popular, and thus the amount of data handled in a process of encoding moving pictures has been becoming very large. Particularly, in a field of consumer small cameras, such as movie cameras and digital still cameras which operate with small batteries, high-performance technologies for encoding moving pictures which can process data in a compact size and with a low power consumption have been actively studied.

Meanwhile, in order to introduce the pleasure of recording moving pictures more widely in the market, product lines of consumer small cameras such as movie cameras and digital still cameras include products which provide a distinguishing feature not only to record imaged images, but also to sequentially combine previous and current images while recording moving pictures so that trajectories of a moving object are drawn when taking moving pictures of a golf swing, a baseball bat swing, etc.

A general method to record moving pictures in such a way by combining previous and current images, and then by sequentially encoding moving pictures of the generated composite images will be described below.

FIG. 13 is a diagram schematically illustrating a typical image combining and encoding device which combines previous and current images, and sequentially encodes moving pictures of the generated composite images. The image combining and encoding device 101 includes an input terminal 2, a storage section 3, a configuration terminal 4, an image combining section 5, an encoding section 6, and an output terminal 7.

A current image is sequentially input to the input terminal 2. The storage section 3 includes a frame memory 31, a composite image memory 32, and a reference image memory 33. The frame memory 31 temporarily stores a current image needed for image combining. The composite image memory 32 temporarily stores a previous image and a composite image. The reference image memory 33 temporarily stores a reference image. The configuration terminal 4 sets a composition ratio $\alpha$ between the current and the previous images, where the composition ratio $\alpha$ is a weighting ratio of the current image to the composite image, and satisfies $0 \leq \alpha \leq 1$. The image combining section 5 combines the current and the previous images 8 and 9 at the composition ratio $\alpha$ set by the configuration terminal 4, and sequentially generates and outputs the composite image 10 to the composite image memory 32. The encoding section 6 receives image data 11 sequentially read from the composite image memory 32 in a format suitable for encoding moving pictures (e.g., in units of macro-blocks each formed of 16×16 pixels), encodes the image data 11, and outputs a data stream (compressed data). The output terminal 7 outputs the data stream (compressed data) encoded in the encoding section 6.

As shown in FIG. 14, the image combining section 5 includes a composition-ratio configuration section 51, multipliers 52 and 53, and an adder 54. The composition-ratio configuration section 51 outputs the composition ratio $\alpha$ set by the configuration terminal 4 to the multiplier 52, and a composition-ratio $(1-\alpha)$ to the multiplier 53. Note that the composition-ratio $(1-\alpha)$ is a weighting ratio of the previous image to the composite image. The multiplier 52 multiplies the values of current image 8 by the composition ratio $\alpha$. The multiplier 53 multiplies the values of previous image 9 by the composition ratio $(1-\alpha)$. The adder 54 adds together the multiplication results of the multipliers 52 and 53, and generates the composite image 10. That is, a higher value of the composition ratio $\alpha$ causes the current image 8 to have a larger effect on the composite image 10, while a lower value of the composition ratio $\alpha$ causes the previous image 9 to have a larger effect on the composite image 10.

Next, a method to combine current and previous images, and then to sequentially encode the composite images using the image combining and encoding device 101 when images as shown in FIGS. 15A-15J are sequentially input will now be described with reference to the flowchart of FIG. 16.

First, the composition ratio $\alpha$ for the image combining section 5 is set from the configuration terminal 4, and the composite image memory 32 is initialized by writing values of zero to the entire area of the composite image memory 32 (ST1001).

<Process of First Frame (at Time T1)>

Then, a current image (input image) shown in FIG. 15A is input from the input terminal 2 at time T1, and is temporarily stored in the frame memory 31 (ST1002).

Next, the current image 8 temporarily stored in the frame memory 31 is sequentially read (ST1003). In parallel with this operation, image data 9 which are included in the previous image (at this stage, immediately after an initialization, all image data have values of zero) stored in the composite image memory 32 and which are located in a same region as that of the current image 8 in a two-dimensional space are sequentially read (ST1004). The images 8 and 9 are sequentially combined in the image combining section 5 (ST1005), and the composite image 10 is sequentially overwritten on the same region in the composite image memory 32; thus, the composite image 10 (the image shown in FIG. 15B) is temporarily stored in the composite image memory 32 (ST1006).

Next, the composite image 11 temporarily stored in the composite image memory 32 is read in a format suitable for encoding moving pictures (e.g., in units of macro-blocks each formed of 16×16 pixels), and is sequentially input to the encoding section 6 (ST1007). In the encoding section 6, intraframe predictive coding (I-picture coding) is sequentially performed on the composite image 11, and a data stream is output from the output terminal 7 (ST1008).

Next, the encoding section 6 performs local decoding such as a combination of dequantization and inverse DCT etc. to generate a reconstructed image, and temporarily stores the reconstructed image in the reference image memory 33 as the reference image 13 needed for interframe predictive coding of following frames (ST1009).

After the above steps ST1002-ST1009 are completed, at step ST1010, whether or not to terminate the encoding process is determined. If the process should continue to encode the composite image 11 of the next frame (No at ST1010), the process returns to step ST1002, and then a process similar to that described above is performed. If no more encoding is required (Yes at ST1010), all the process terminates.

<Process of Second Frame (at Time T2)>

Then, the current image shown in FIG. 15C is input from the input terminal 2 at time T2, and is temporarily stored in the frame memory 31 (ST1002).

Next, the current image 8 temporarily stored in the frame memory 31 is sequentially read (ST1003). In parallel with this operation, image data 9 which are included in the previous image (the image shown in FIG. 15B) stored in the composite image memory 32 and which are located in a same region as that of the current image 8 in a two-dimensional space are sequentially read (ST1004). The images 8 and 9 are sequentially combined in the image combining section 5 (ST1005), and the composite image 10 is sequentially overwritten on the same region in the composite image memory 32; thus, the composite image 10 (the image shown in FIG. 15D) is temporarily stored in the composite image memory 32 (ST1006).

Next, the composite image 11 temporarily stored in the composite image memory 32 is read in a format suitable for encoding moving pictures (e.g., in units of macro-blocks each formed of 16×16 pixels), and is sequentially input to the encoding section 6 (ST1007). In the encoding section 6, while the reference image 12 is sequentially read from the reference image memory 33, interframe predictive coding (P-picture coding) is sequentially performed on the composite image 11, and a data stream is output from the output terminal 7 (ST1008).

Next, the encoding section 6 performs local decoding such as a combination of dequantization and inverse DCT etc. to generate a reconstructed image, and temporarily stores the reconstructed image in the reference image memory 33 as the reference image 13 needed for interframe predictive coding of following frames (ST1009).

After the above steps ST1002-ST1009 are completed, at step ST1010, whether or not to terminate the encoding process is determined. If the process should be continued to encode the composite image 11 of the next frame (No at ST1010), the process returns to step ST1002, and then a process similar to that described above is performed. If no more encoding is required (Yes at ST1010), all the process terminates.

<Process of and after Third Frame (at Times T3-T5)>

The process of image combining and encoding of and after the third frame is similar to that for the second frame (at time T2) as described above. This process eventually causes the composite image 11 as shown in FIG. 15J to be encoded at time T5. The tracked trajectories of a moving object at respective times T1-T5 are drawn as indicated by the arrows; thus, a trajectory of a moving body can be visually perceived each time when recorded moving pictures are reproduced.

Technologies to combine images and to encode generated composite images are disclosed in Patent Document 1 and Patent Document 2.

Patent Document 1: Japanese Patent Publication No. 2002-044521

Patent Document 2: Japanese Patent Publication No. 2008-113112

SUMMARY

A brief description has been provided in terms of a typical operation to combine previous and current images and to sequentially encode generated composite images. Such an operation requires the composite image memory 32 to be additionally provided to temporarily store the composite images 10 which are generated by combining the current and the previous images 8 and 9.

Moreover, when configuring the storage section 3 by a high-capacity memory device such as a DRAM so that the composite image memory 32 shares the memory device with the frame memory 31 and the reference image memory 33, memory access during a process of image combining or encoding is performed on only one memory, thereby requiring a high-performance high-capacity DRAM. This makes it difficult to achieve size reduction and reduction in power consumption. In particular, when images contained in high-resolution video, such as one having HDTV resolution, are combined and encoded in parallel, the issue described above poses a serious problem in configuring a system.

In addition, a composite image 10 is once temporarily stored in the composite image memory 32, and a composite image 11 is read from the composite image memory 32 for encoding and then encoded; thus a problem also arises in that a delay time from input of the current image to a start of encoding is noticeable.

Note that both the technologies disclosed in Patent Documents 1 and 2 each requires an additional memory area for temporarily storing previous images for image combining; therefore, the above problem is difficult to solve.

In order to solve these problems, it is an object of the present invention to provide an image combining and encoding method and device which can achieve a set of processes to combine previous and current images and to encode generated composite images in a compact size and with a low power consumption.

In order to achieve the above object, an image combining and encoding method according to the present invention includes combining a current image and a previous image at a predetermined composition ratio on a per block basis, and generating a composite image; and sequentially encoding moving pictures of the composite image generated in the combining, where a reference image generated in the encoding is used as the previous image in the combining.

In the image combining and encoding method according to the present invention, image data which are included in the reference image needed in the encoding and which are in a same location as that of the current image in a two-dimensional space are combined, as the previous image in the combining, with the current images at the predetermined composition ratio, and the combined composite image is encoded in the encoding.

In the image combining and encoding method according to the present invention, a period in which the current and the previous images are combined and the composite image is generated in the combining, and a period in which the reference image used for encoding in the encoding is updated are separately controlled according to a frame rate of an image input.

In the image combining and encoding method according to the present invention, motion contained in the composite image is detected based on motion vector information detected in the encoding, and an update period of the reference image used for encoding in the encoding is controlled based on the detected motion.

The image combining and encoding method according to the present invention further includes presetting a region within which the current and the previous images are combined; and when sequentially combining the current and the previous images on a predetermined per block basis in the combining, determining whether or not a target block belongs to the region preset in the presetting, where if it is determined, in the determining, that the target block belongs to the region, the current and the previous images are combined at the predetermined composition ratio in the combining, while if it is determined that the target block does not belong to the region, the current and the previous images are not combined, but the current image is used as a target image for encoding in the encoding.

In the image combining and encoding method according to the present invention, two of the composition ratios, which are a composition ratio inside a region and a composition ratio outside the region, are set in the combining, and if it is determined that the target block belongs to the region in the determining, the current and the previous images are combined at the composition ratio inside the region, while if it is determined that the target block does not belong to the region, the current and the previous images are combined at the composition ratio outside the region.

The image combining and encoding method according to the present invention further includes setting a threshold value needed for sequentially determining, on a predetermined per block basis, whether or not the current image contains motion against the previous image; previously detecting motion contained in the current image against the previous image before the current and the previous images are combined in the combining; and determining whether or not to combine the current and the previous images based on a result of comparison between the detection result of the previously detecting and the threshold value, where if it is determined, in the determining, that combining is to be performed, the current and the previous images are combined at the predetermined composition ratio in the combining, while if it is determined that combining is not to be performed, the current and the previous images are not combined, but the current image is used as a target image for encoding in the encoding.

In the image combining and encoding method according to the present invention, multiple ones of the composition ratio are set in the combining, and multiple ones of the threshold value are set in the setting; in the determining, an extent of motion is determined by comparing the motion detected in the previously detecting with each of the multiple ones of the threshold value, and whether or not to combine the current and the previous images is determined based on the extent of motion; and if it is determined, in the determining, that combining is to be performed, the current and the previous images are combined in the combining at a composition ratio, corresponding to the extent of motion, of the multiple ones of the composition ratio.

In the image combining and encoding method according to the present invention, the threshold value set in the setting is a motion vector value.

In the image combining and encoding method according to the present invention, the threshold value set in the setting is a sum of absolute differences, which represents a degree of correlation between the current and the previous images.

In the image combining and encoding method according to the present invention, the previously detecting is performed in a motion detection process needed in the encoding.

In the image combining and encoding method according to the present invention, the previously detecting is performed by using a simple motion-detection method in which a sum of absolute differences between the current image and the previous image located in a same location as the current image in a two-dimensional space is calculated.

In the image combining and encoding method according to the present invention, the composition ratio set in the combining is individually set for each of a luminance component and a chrominance component.

In the image combining and encoding method according to the present invention, the composition ratios are set so that the composition ratio for a chrominance component is higher than the composition ratio for a luminance component.

An image combining and encoding device according to the present invention, which combines a current image and a previous image at a predetermined composition ratio on a per block basis, and sequentially encodes moving pictures of a generated composite image, includes an input terminal configured to sequentially input the current image; a frame memory configured to temporarily store the current image needed for image combining; a reference image memory configured to temporarily store a reference image needed for encoding; a configuration terminal configured to set a composition ratio for the current image and the previous image; an image combiner configured to sequentially generate the composite image; the encoder configured to sequentially receive the composite image generated in the image combiner, to encode the composite image using the reference image read from the reference image memory, to output a reconstructed image generated by encoding to the reference image memory as the reference image for following frames, and to output image data which are included in the reference image and which are located in a same location as that of the composite image in a two-dimensional space to the image combiner as the previous image; and an output terminal configured to output a data stream encoded in the encoder, where the image combiner combines the current image sequentially input from the frame memory and the previous image input from the encoder at the composition ratio set by the configuration terminal.

In the image combining and encoding device according to the present invention, the frame memory and the reference image memory are configured by a shared memory.

An imaging system according to the present invention includes an image processing circuit, including an image combining and encoding section which can perform the image combining and encoding method described above, configured to perform image processing, and a conversion circuit configured to convert an input analog image signal to a digital image signal, and to output the digital image signal to the image processing circuit.

The imaging system according to the present invention further includes a sensor and an optical system configured to focus light onto the sensor, where the sensor photoelectrically converts image light focused by the optical system into an electric signal, and outputs the electric signal to the conversion circuit.

According to the present invention, since the reconstructed image (reference image) generated in encoding is used as the previous image in image combining, no dedicated memories are additionally required for image combining, thereby allowing size reduction (memory capacity reduction) to be achieved.

In addition, since the reference image read from a storage unit upon encoding is used by both the encoder and the image combiner, the number of accesses to the storage unit can be significantly reduced, thereby allowing the power consumption to be reduced.

Moreover, since the composite image generated by the image combiner is not temporarily stored in the storage unit, but immediately input to the encoder for encoding, a delay time since the current image is input until the encoding starts can be minimized.

BRIEF DESCRIPTION OF THE DRAWINGS

FIGS. 6A-6J are diagrams conceptually illustrating an image combining process and updates of the reference image memory according to the second embodiment of the present invention.

FIG. 7 is a flowchart showing a flow of the process of combining and encoding images according to the third embodiment of the present invention.

FIGS. 15A-15J are diagrams conceptually illustrating input images (current images) and generated composite images.

FIG. 16 is a flowchart showing a flow of the process of combining and encoding images using a conventional image combining and encoding device.

DETAILED DESCRIPTION

Example embodiments of the present invention will be described below with reference to the drawings.

First Embodiment

Figure 1:
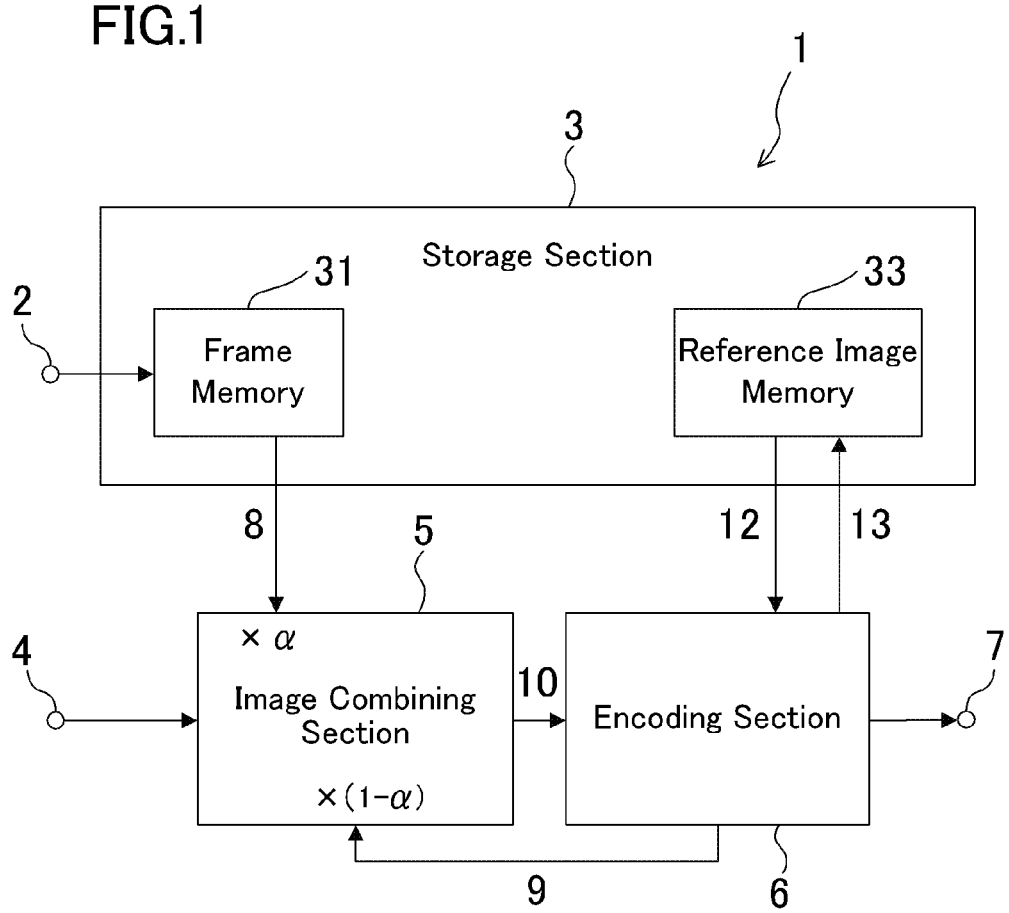
FIG. 1 is a diagram illustrating a configuration of an image combining and encoding device according to the first embodiment of the present invention.
Figure 13:
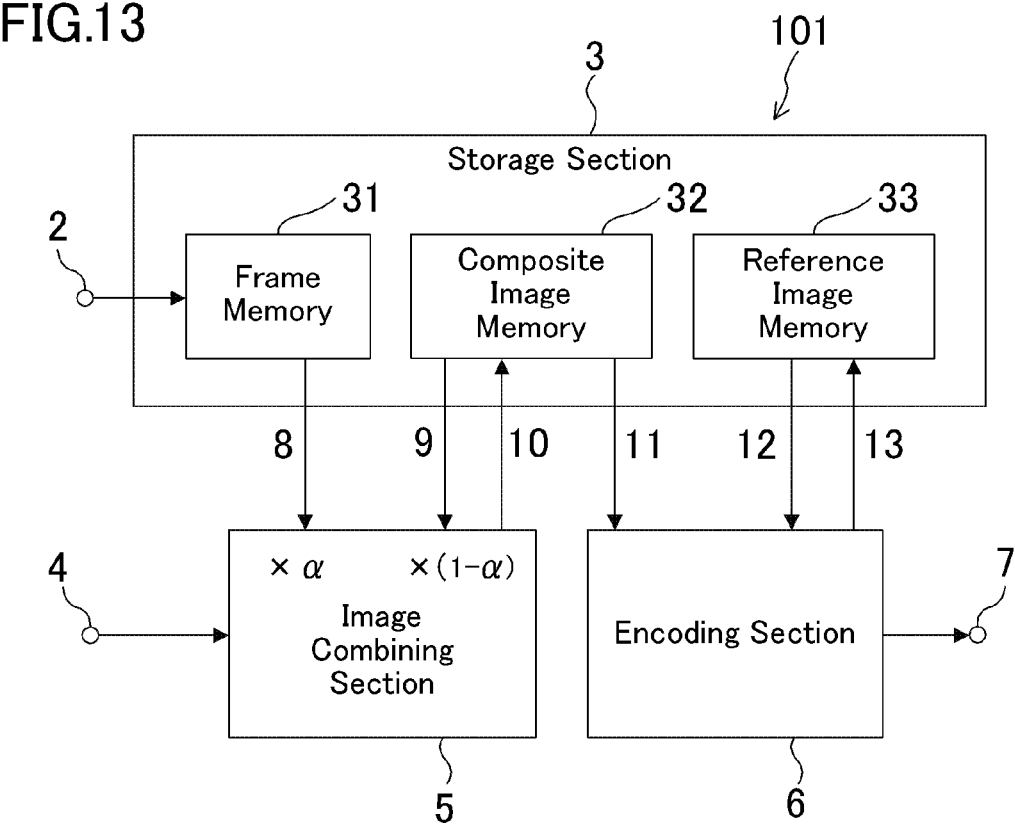
FIG. 13 is a diagram illustrating a configuration of a conventional image combining and encoding device.
Figure 14:
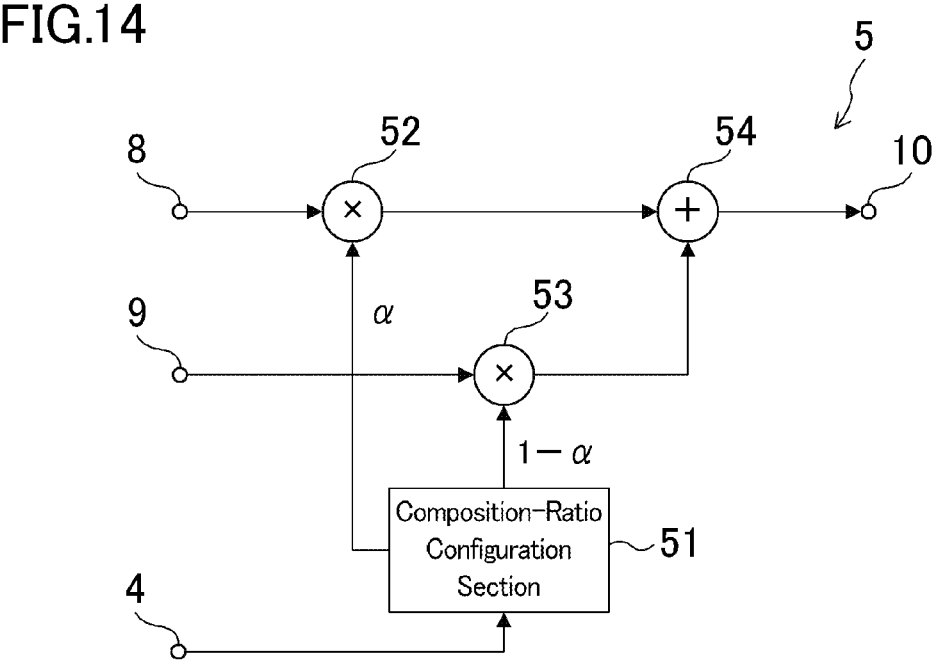
FIG. 14 is a diagram illustrating a configuration of the image combining section of the conventional image combining and encoding device.

FIG. 1 is a diagram illustrating an image combining and encoding device 1 according to the first embodiment of the present invention, which is significantly different from the conventional image combining and encoding device 101 shown in FIG. 13 in that the composite image memory 32 in the storage section 3 is not required.

The image combining and encoding device 1 of FIG. 1 includes an input terminal 2, a storage section 3, a configuration terminal 4, an image combining section 5, an encoding section 6, and an output terminal 7.

A current image is sequentially input to the input terminal 2.

The storage section 3 includes a frame memory 31 and a reference image memory 33. The frame memory 31 temporarily stores a current image needed for image combining. The reference image memory 33 temporarily stores a reference image needed for encoding.

The configuration terminal 4 sets a composition ratio $\alpha$ between the current image 8 sequentially input from the frame memory 31 and the previous image 9 input from the encoding section 6. Here, the composition ratio $\alpha$ is a weighting ratio of the current image to the composite image, and satisfies $0 \leq \alpha \leq 1$.

The image combining section 5 combines the current and the previous images 8 and 9 at the composition ratio $\alpha$ set by the configuration terminal 4, and sequentially generates a composite image 10.

The encoding section 6 sequentially receives the composite image 10 generated in the image combining section 5 in a format suitable for encoding moving pictures (e.g., in units of macro-blocks each formed of 16×16 pixels), encodes moving pictures of the reference image 12 read from the reference image memory 33, outputs a reconstructed image generated by encoding to the reference image memory 33 as a reference image 13 needed for encoding following frames, and outputs image data which are included in the reference image 12 and which are located in a same location as that of the composite image 10 in a two-dimensional space to the image combining section 5 as the previous image 9.

The output terminal 7 outputs a data stream (compressed data) encoded in the encoding section 6.

Figure 2:
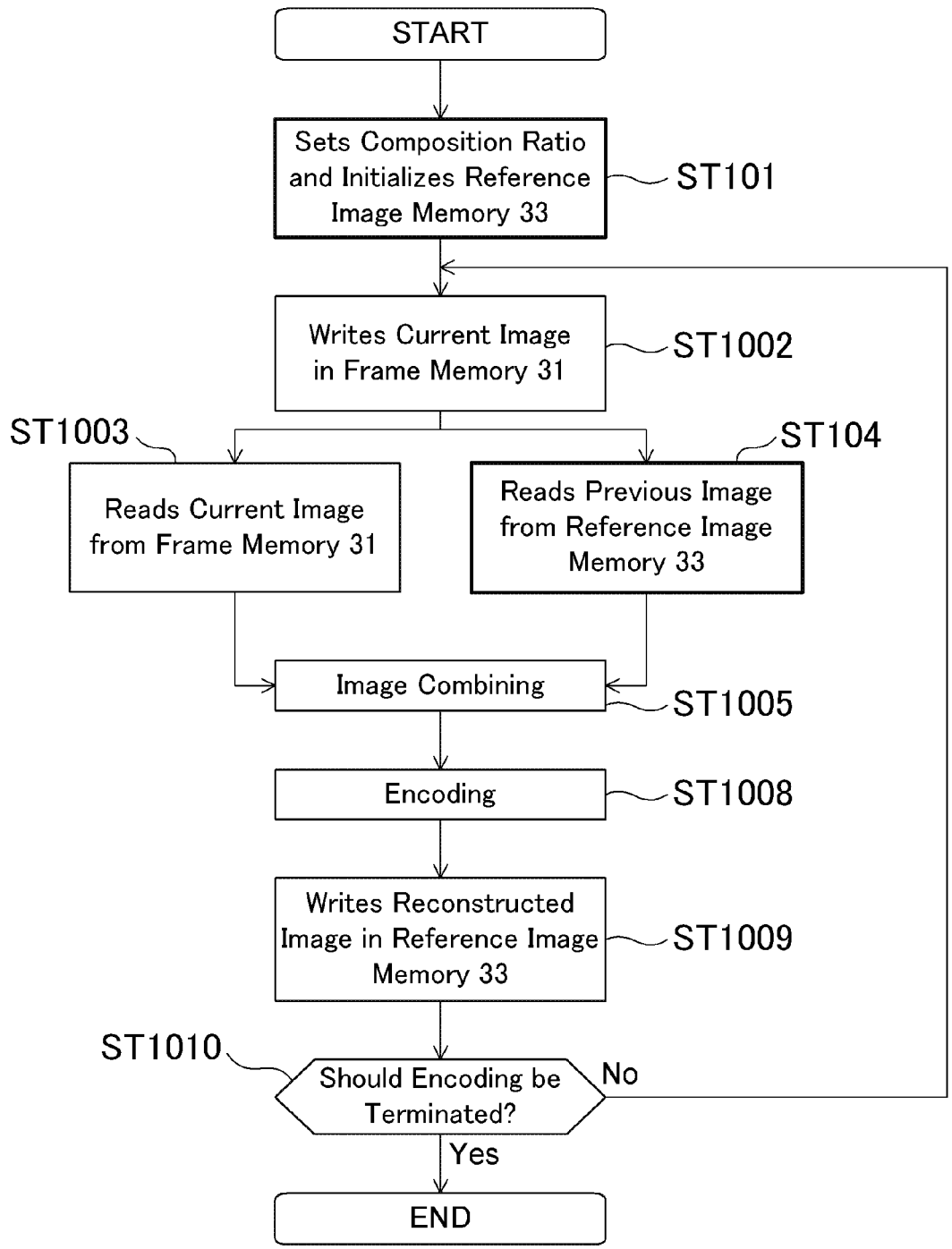
FIG. 2 is a flowchart showing a flow of the process of combining and encoding images according to the first embodiment of the present invention.

The procedure to combine the current and the previous images 8 and 9 using the image combining and encoding device 1 of FIG. 1 and to sequentially encode the generated composite image 10 will be described below using the flowchart of FIG. 2. This procedure is significantly different from the conventional processing procedure shown in FIG. 16 in that the reference image 12, temporarily stored in the reference image memory 33 and used for encoding by the encoding section 6, is also used as the previous image 9 by the image combining section 5 (ST104).

First, the composition ratio $\alpha$ for the image combining section 5 is set from the configuration terminal 4, and the reference image memory 33 is initialized by writing values of zero to the entire area of the reference image memory 33 (ST101).

<Process of First Frame (at Time T1)>

Then, the current image shown in FIG. 15A is input from the input terminal 2 at time T1, and is temporarily stored in the frame memory 31 (ST1002).

Next, the current image 8 temporarily stored in the frame memory 31 is sequentially read in a format suitable for encoding moving pictures (e.g., in units of macro-blocks each formed of 16×16 pixels) (ST1003). In parallel with this operation, the encoding section 6 sequentially reads, on a per macro-block basis, image data 12 which are included in the previous image (at this stage, immediately after an initialization, all image data have values of zero) stored in the reference image memory 33 and which are located in a same region as that of the current image 8 in a two-dimensional space, and then outputs the image data 12 to the image combining section 5 as the previous image 9 (ST104).

Next, the current image 8 read at step ST1003 and the previous image 9 read at step ST104 are sequentially combined in the image combining section 5, and the composite image 10 is output to the encoding section 6 (ST1005).

Next, in the encoding section 6, intraframe predictive coding (I-picture coding) is sequentially performed on the composite image 10 input sequentially, and a data stream is output from the output terminal 7 (ST1008).

Next, the encoding section 6 performs local decoding such as a combination of dequantization and inverse DCT etc. to sequentially generate a reconstructed image, and temporarily stores the reconstructed image in the reference image memory 33 as the reference image 13 needed for interframe predictive coding of following frames (ST1009).

After the above steps ST1002-ST1009 are completed, at step ST1010, whether or not to terminate the encoding process is determined. If the process should continue to encode the next composite image 10 (No at ST1010), the process returns to step ST1002, and then a process similar to that described above is performed. If no more encoding is required (Yes at ST1010), all the process terminates.

<Process of Second Frame (at Time T2)>

Then, the current image shown in FIG. 15C is input from the input terminal 2 at time T2, and is temporarily stored in the frame memory 31 (ST1002).

Next, the current image 8 temporarily stored in the frame memory 31 is sequentially read (ST1003). In parallel with this operation, image data which are included in the previous image (the image shown in FIG. 15B) stored in the reference image memory 33 and which belong to nearby macro-blocks including the macro-block located in a same region as that of the current image 8 in a two-dimensional space are read as the reference image 12; of these image data, image data of the macro-block located in the same region as that of the current image 8 in a two-dimensional space are output to the image combining section 5 as the previous image 9 (ST104).

Next, the current image 8 read at step ST1003 and the previous image 9 read at step ST104 are sequentially combined in the image combining section 5, and the composite image 10 is output to the encoding section 6 (ST1005).

Next, in the encoding section 6, interframe predictive coding (P-picture coding), including motion detection for the input composite image 10, is sequentially performed using the reference image 12 as a reference image, and a data stream is output from the output terminal 7 (ST1008).

Next, the encoding section 6 performs local decoding such as a combination of dequantization and inverse DCT etc. to generate a reconstructed image, and temporarily stores the reconstructed image in the reference image memory 33 as the reference image 13 needed for interframe predictive coding of following frames (ST1009). In this connection, the reconstructed image is stored in the reference image memory 33 so that the reference image needed for interframe coding of following macro-blocks in the target frame for encoding will not be destroyed by overwrite.

After the above steps ST1002-ST1009 are completed, at step ST1010, whether or not to terminate the encoding process is determined. If the process should continue to encode the composite image of the next frame (No at ST1010), the process returns to step ST1002, and then a process similar to that described above is performed. If no more encoding is required (Yes at ST1010), all the process terminates.

<Process of and after Third Frame (at Times T3-T5)>

The process of image combining and encoding of and after the third frame is similar to that for the second frame (at time T2) as described above. This process eventually causes the composite image as shown in FIG. 15J to be encoded at time T5. The tracked trajectories of a moving object at respective times T1-T5 can be visually perceived as indicated by the arrows.

Although the description above is provided, for simplicity of explanation, assuming that the steps ST1002-ST1009 are sequentially executed, each step may be individually executed if the process is implemented in a technique supporting parallel processing such as suitable hardware and when each process of the steps ST1002-ST1009 is ready for execution; thus, the present invention is not limited to the procedure described above.

Thus, according to the first embodiment, there is no need to additionally provide the composite image memory 32 for temporarily storing the composite image generated by combining a current and a previous images, thereby allowing size reduction (memory capacity reduction) to be achieved. At the same time, since the number of accesses to the storage unit can be minimized when performing a sequence of processing such as image combining and encoding, reduction in power consumption can be concurrently achieved.

Second Embodiment

Figure 3:
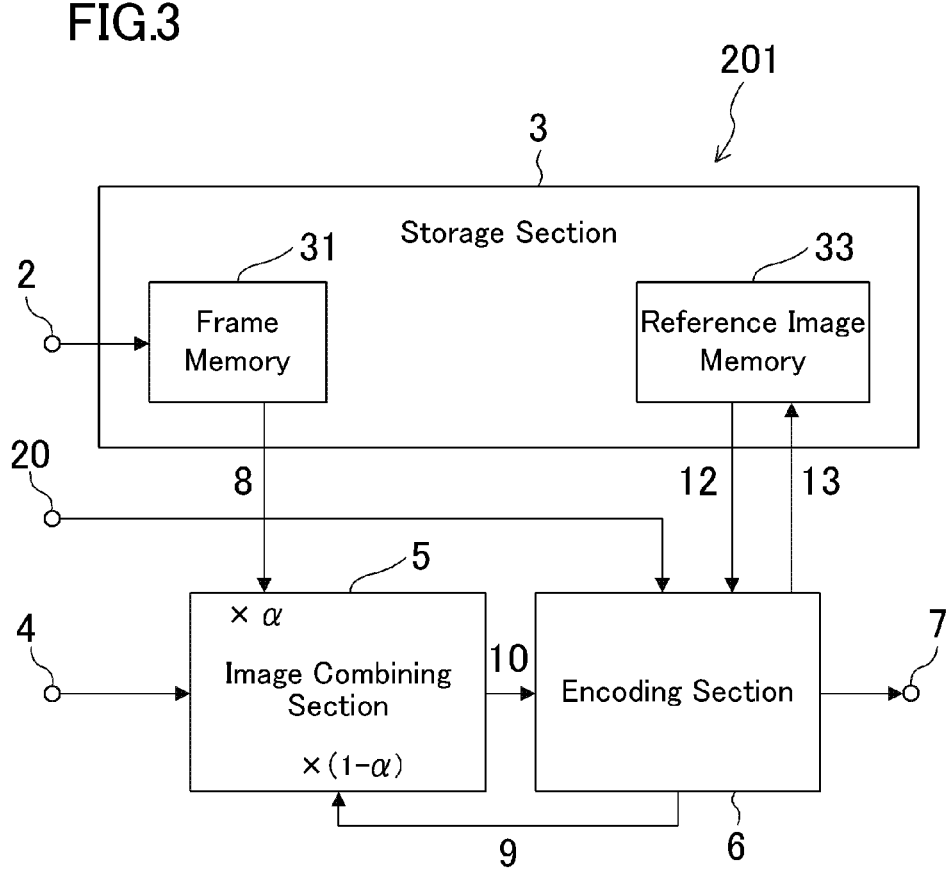
FIG. 3 is a diagram illustrating a configuration of an image combining and encoding device according to the second embodiment of the present invention.
Figure 4:
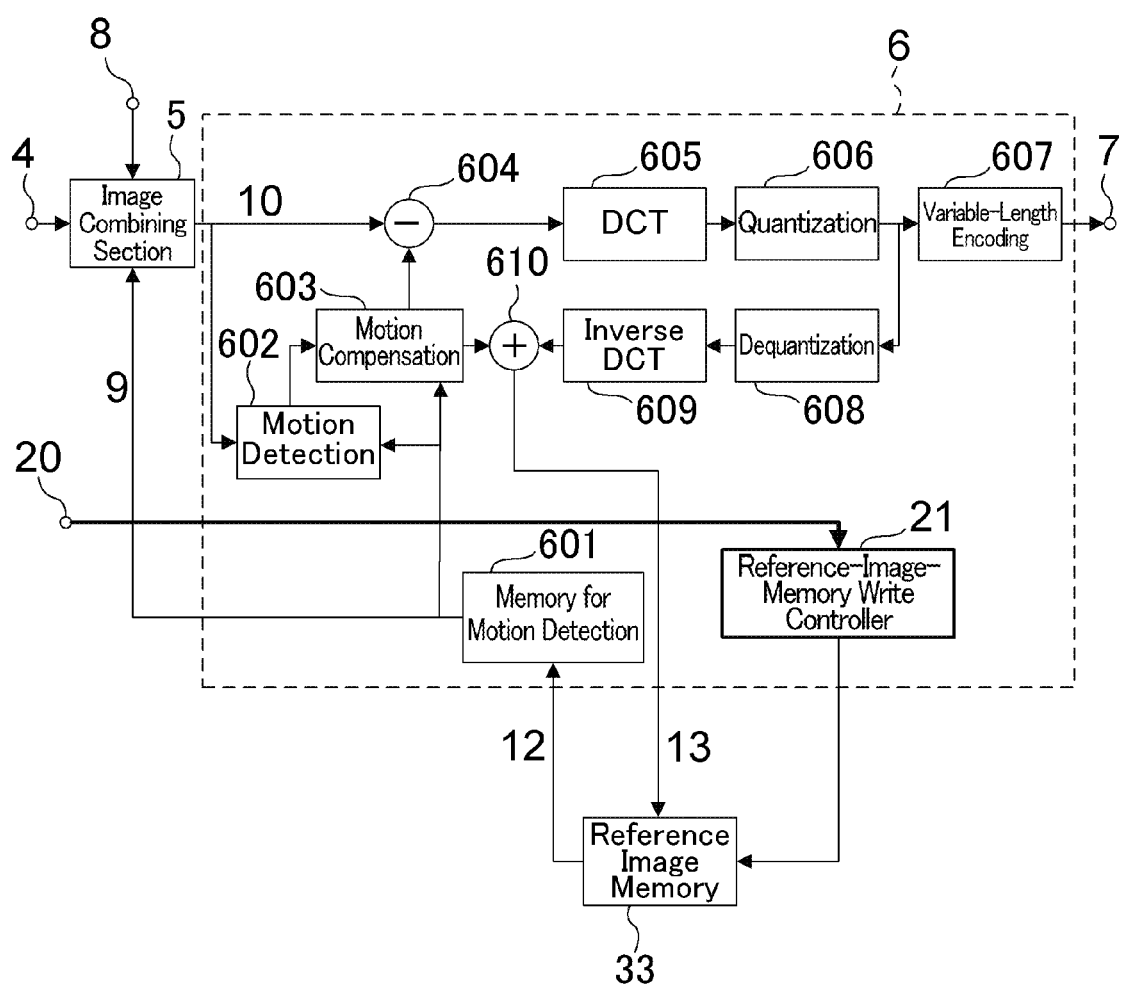
FIG. 4 is a diagram illustrating a configuration of the encoding section according to the second embodiment of the present invention.

FIG. 3 is a diagram illustrating a schematic configuration of an image combining and encoding device 201 according to the second embodiment of the present invention. FIG. 4 is a diagram schematically illustrating an internal configuration of the encoding section 6 shown in FIG. 3.

This embodiment is different from the first embodiment in that a reference-image-memory write controller 21 (FIG. 4) and an external configuration terminal 20 are additionally provided. The reference-image-memory write controller 21 controls whether or not to write, on a per frame basis, the reconstructed image 13 generated in the encoding section 6 to the reference image memory 33 (i.e., whether or not to update the reference image memory 33). The external configuration terminal 20 sets an update period of the reference image memory 33 to the reference-image-memory write controller 21.

Figure 6A:
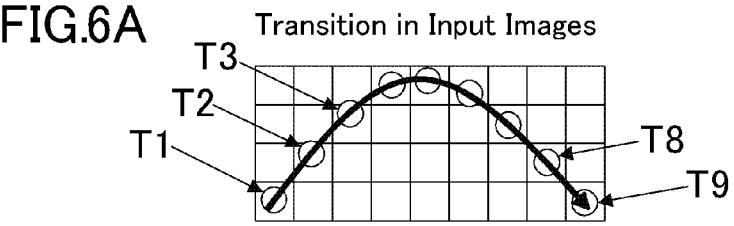

In the first embodiment, an input current image and a previous image are always combined before encoding. Thus, if input images have a moving object moving in relatively small steps at times T1-T9 as shown in FIG. 6A, the trajectories of the moving object are recorded also in relatively small steps. Reproducing these recorded images poses a problem in that the trajectories of the moving object overlap each other, and thus appear visually displeasing. In particular, in recent years, imaging devices, such as CMOS sensors, supporting high-speed imaging have been produced which each has a capability to image and read images having VGA resolution at a rate of 300 images per second; and if image data obtained using such an imaging device are combined and recorded, the problem described above becomes more evident.

Figure 5:
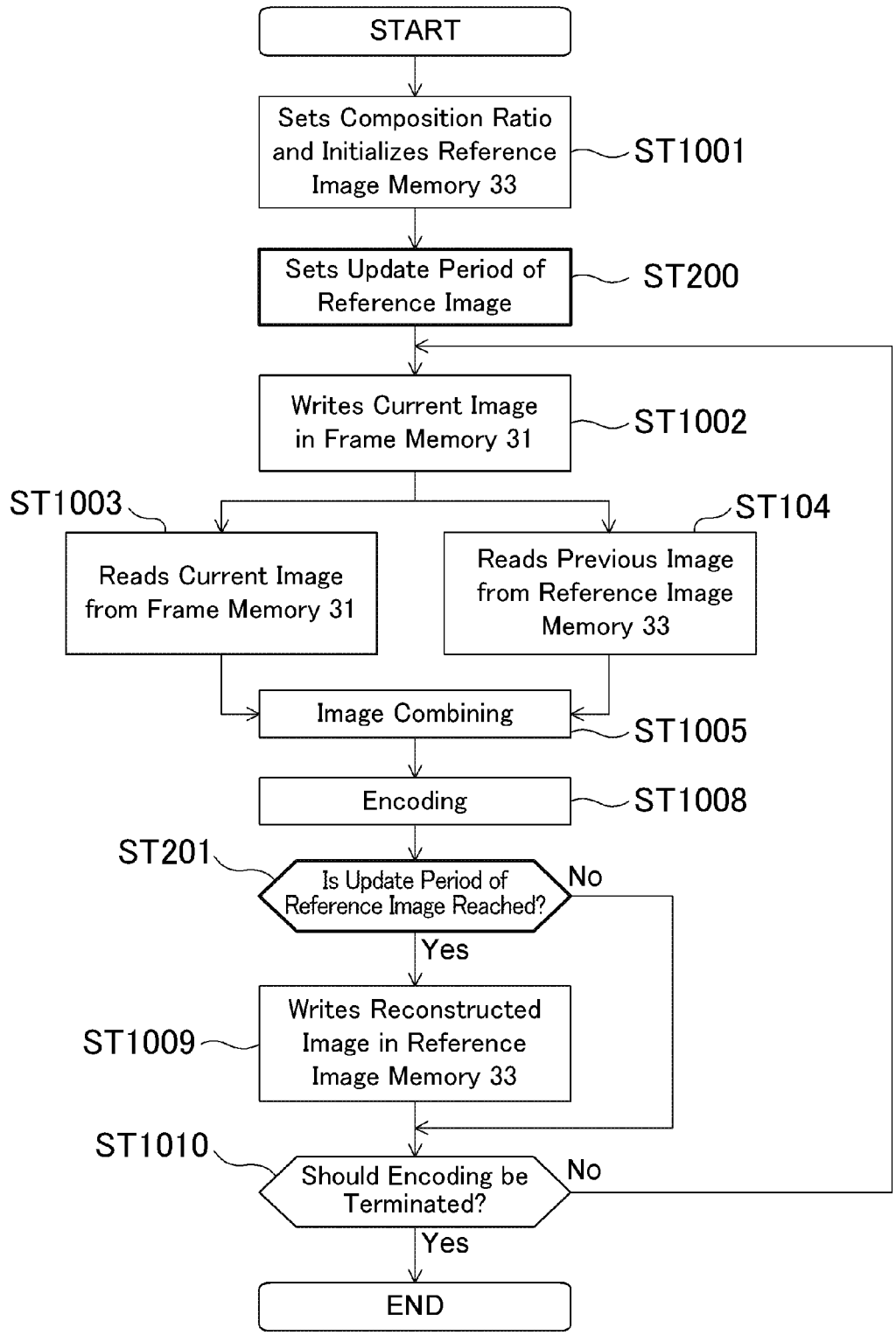
FIG. 5 is a flowchart showing a flow of the process of combining and encoding images according to the second embodiment of the present invention.

It is an object of the second embodiment to solve the problem described above. A detailed description thereof will be provided below using the flowchart of FIG. 5. Note that a detailed explanation is omitted for the steps to perform similar processes to those of the first embodiment.

At step ST1001, a composition ratio is set in the image combining section 5, and the reference image memory 33 is initialized. Then, at step ST200, an update period of the reference image in the reference image memory 33 is set from the external configuration terminal 20. The update period of the reference image is a frame rate of the image retained in the reference image memory 33 as a previous image with respect to a frame rate of the input image. More particularly, for example, when an input image is input at a frame rate of 30 frames per second (fps), the update period is set so that a composite image is recorded while retaining a previous image at a frame rate of 15 fps.

Next, steps ST1002-ST1008 are executed according to a procedure similar to that of the first embodiment.

Thereafter, it is determined whether or not to write the reconstructed image 13 generated in the encoding section 6 to the reference image memory 33 (i.e., whether or not to update the reference image memory 33) (ST201). If it is determined that the reference image memory 33 should be updated (Yes at ST201), then the reconstructed image 13 is written in the reference image memory 33 as the previous image used for the process of following frames (ST1009). On the contrary, if it is determined that an update of the reference image memory 33 is not required (No at ST201), the process continues to step ST1010.

An overview of updating process of the reference image memory 33 and of a composite image subject to encoding is briefly described using FIGS. 6A-6J.

First, the input image shown in FIG. 6B is encoded at time T1, and the reconstructed image 13 is written in the reference image memory 33.

Then, the input image (white circle) shown in FIG. 6C is input at time T2 as the current image. This current image and the previous image (shaded circle) input concurrently and sequentially are combined and encoded. However, the reconstructed image 13 generated in the encoding section 6 is not written in the reference image memory 33. That is, the composite image which is encoded at time T2 is not used as the previous image for image combining nor encoding of following frames, and thus the location of object in the current image input at time T2 does not appear in the eventual trajectories of the moving object.

Next, the input image (white circle) shown in FIG. 6D is input at time T3 as the current image. This current image and the previous image (shaded circle) input concurrently and sequentially are combined and encoded. This time, the reconstructed image 13 generated in the encoding section 6 is written in the reference image memory 33. That is, the composite image which is encoded at time T3 is used as the previous image for image combining and encoding of following frames, and thus the location of object in the current image input at time T3 appears in the eventual trajectories of the moving object.

In this way, iterative execution of the operations at times T2 and T3 until time T9 allows a composite image such as shown in FIG. 6J, which is also visually preferable, to be obtained in which trajectories of the moving object are removed at a regular interval of time.

Third Embodiment

FIG. 7 is a flowchart of an image combining and encoding method according to the third embodiment of the present invention. This embodiment is different from the second embodiment (FIG. 5) in that there are additional steps of detecting a magnitude of motion of an entire composite image based on motion vector information obtained upon sequential encoding of the composite image in the encoding section 6 (ST300), and of controlling to adaptively change an update period of the reference image (ST301).

In the second embodiment, the frame rate of an image retained in the reference image memory 33 as a previous image is fixed with respect to the frame rate of the input image. This poses a problem in that, for example, appearances of the trajectories of a moving object are significantly different from each other between when a scene involving a rapid motion is imaged (moving distance of a moving object per unit time is large) and when a scene involving a smooth motion is imaged (moving distance of a moving object per unit time is relatively small). Specifically, the former situation results in larger intervals between the tracked points on a trajectory of the moving object in a two-dimensional space, while the latter situation results in smaller intervals therebetween.

An object of the third embodiment is to solve such a problem. A detailed description thereof will be provided below using the flowchart of FIG. 7. Note that a detailed explanation is omitted for the steps to perform similar processes to those of the second embodiment, and that the schematic configuration of the image combining and encoding device according to the third embodiment is similar to that of the second embodiment (FIG. 3).

When the current and the previous images are combined; the generated composite image is sequentially encoded on a per macro-block basis; and an encoding process of one frame has been completed, motion vector information on per macro-block basis on the frame is obtained from the encoding section 6. By comparing the average value of the motion vector information on per macro-block basis with a predetermined threshold value, it is determined whether the magnitude of motion contained in the current image against the previous image is "large," "small," or "moderate" (ST300). At step ST300, if the magnitude of motion is determined to be "large," then the update period of the reference image already set is changed to a higher value, while if the magnitude of motion is determined to be "small," then the update period of the reference image already set is changed to a lower value (ST301). If the magnitude of motion is determined to be "moderate" at step ST300, then the update period of the reference image already set is not changed.

Thus, in the third embodiment, the update period of the reference image is adaptively controlled based on the motion vector information obtained by encoding, thereby allowing a visually preferable composite image to be obtained which is likely to be independent of imaged scene.

Fourth Embodiment

Figure 8:
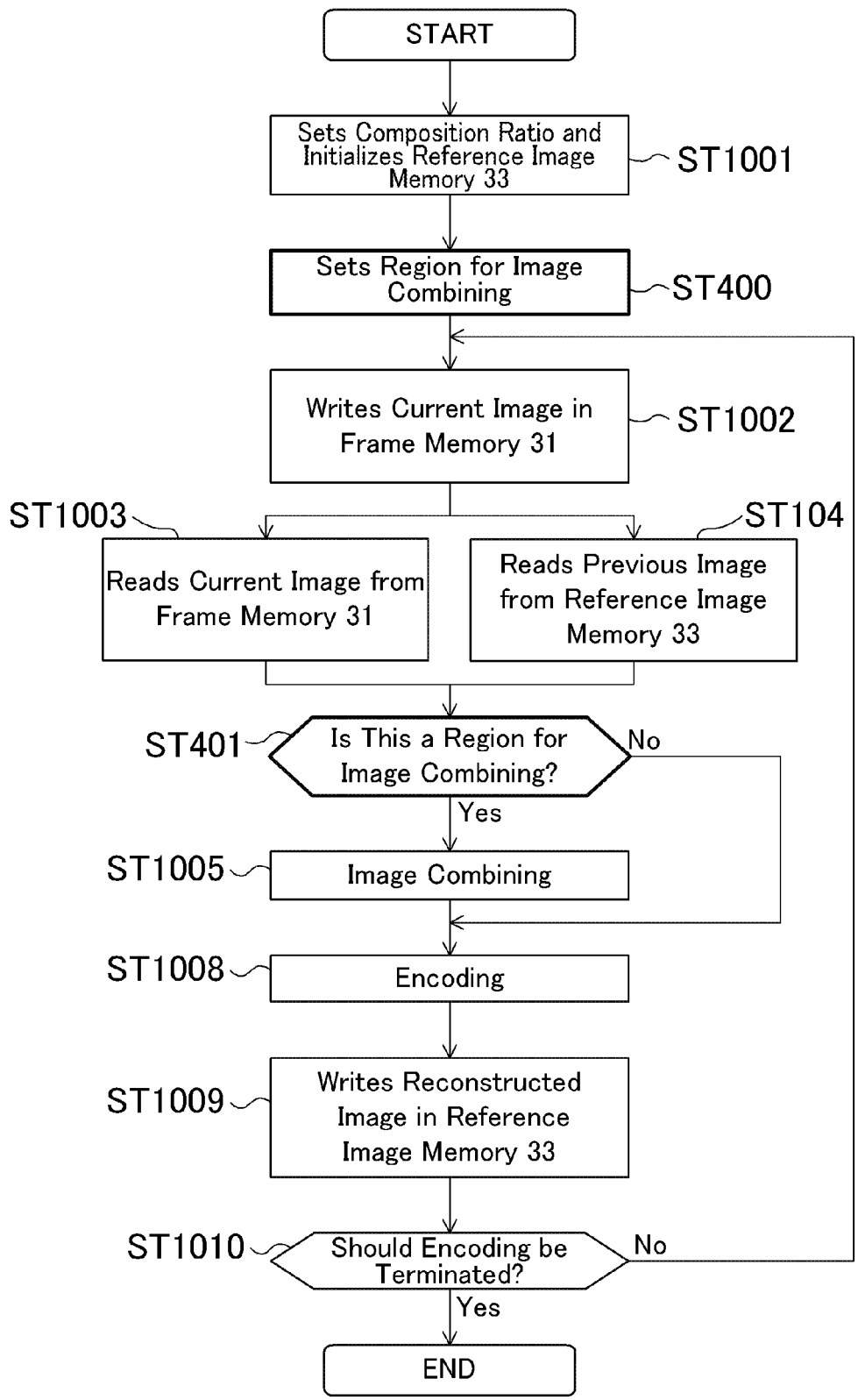
FIG. 8 is a flowchart showing a flow of the process of combining and encoding images according to the fourth embodiment of the present invention.

FIG. 8 is a flowchart of an image combining and encoding method according to the fourth embodiment of the present invention. This embodiment is different from the first embodiment (FIG. 2) in that there are additional steps of presetting a region within which a current and a previous images should be combined (combination region) in the image combining section 5 (ST400), and of determining whether or not each macro-block belongs to the combination region when the images are sequentially combined on a per macro-block basis (ST401).

In the first embodiment, the entire images are combined homogeneously at a preset composition ratio. Therefore, for example, in a region within which a moving object moves (a region within which the trajectory is wanted to be tracked), there is no problem because image combining results in a recording process in which the trajectories are tracked. On the contrary, in a region in the background where there is little move, images are unnecessarily combined when the image contains only small motion, and thus a problem may arise in that a double image or a triple image occurs in an edge portion etc. of an image, thereby causing the image to appear visually displeasing.

An object of the fourth embodiment is to solve such a problem. According to the fourth embodiment, for example, if the region within which a moving object moves (a region within which the trajectory is wanted to be tracked) can be limited to a certain region in the image, presetting the certain region allows the process to be controlled so that only the certain regions of the current and the previous images are combined, and moving pictures are recorded so that the trajectories are tracked, while the current image is solely encoded with respect to the region within which the trajectory is not wanted to be tracked (a region not of interest). Thus, a visually preferable composite image can be obtained for an entire image. A detailed description will be provided below using the flowchart of FIG. 8. Note that a detailed explanation is omitted for the steps to perform similar processes to those of the first embodiment, and that the schematic configuration of the image combining and encoding device according to the fourth embodiment is similar to that of the first embodiment (FIG. 1).

At step ST1001, the composition ratio is set in the image combining section 5, and the reference image memory 33 is initialized. Then, at step ST400, a combination region in the image combining section 5 is set from the configuration terminal 4.

Next, it is determined whether or not the current and the previous images sequentially read at steps ST1003 and ST104 belong to the combination region set in the step ST400 (ST401). If the macro-block is determined to belong to the combination region (Yes at ST401), the current and the previous images are combined at the predetermined composition ratio, and the composite image is output to the encoding section 6 (ST1005). Meanwhile, if the macro-block is determined not to belong to the combination region (No at ST401), the current and the previous images are not combined, but the current image is output to the encoding section 6 as the target image for encoding.

Note that, for simplicity of explanation, the process has been described in which only one region is set in which the images are combined, and described as branching depending on whether the macro-block belongs to the region or not; however, the process may set multiple ones of the region in which the images are combined, and moreover, different composition ratios of images may be individually set for the multiple regions.

In addition, at step ST1001, two composition ratios, which are a composition ratio inside a region and a composition ratio outside the region, may be set in a setting process of composition ratio. In such a case, if, at step ST401, it is determined that the macro-block belongs to the region (Yes at ST401), the current and the previous images may be combined at the composition ratio inside the region, while if it is determined that the macro-block does not belong to the region (No at ST401), the current and the previous images may be combined at the composition ratio outside the region.

Thus, in the fourth embodiment, by limiting the region within which the images are combined, the images can be efficiently combined only in the region within which the trajectory is wanted to be tracked, and at the same time, a side effect of image combining (multiple image in an edge portion etc. of an image which occurs by unnecessarily combining images when the image contains only small motion) can be minimized.

Fifth Embodiment

Figure 9:
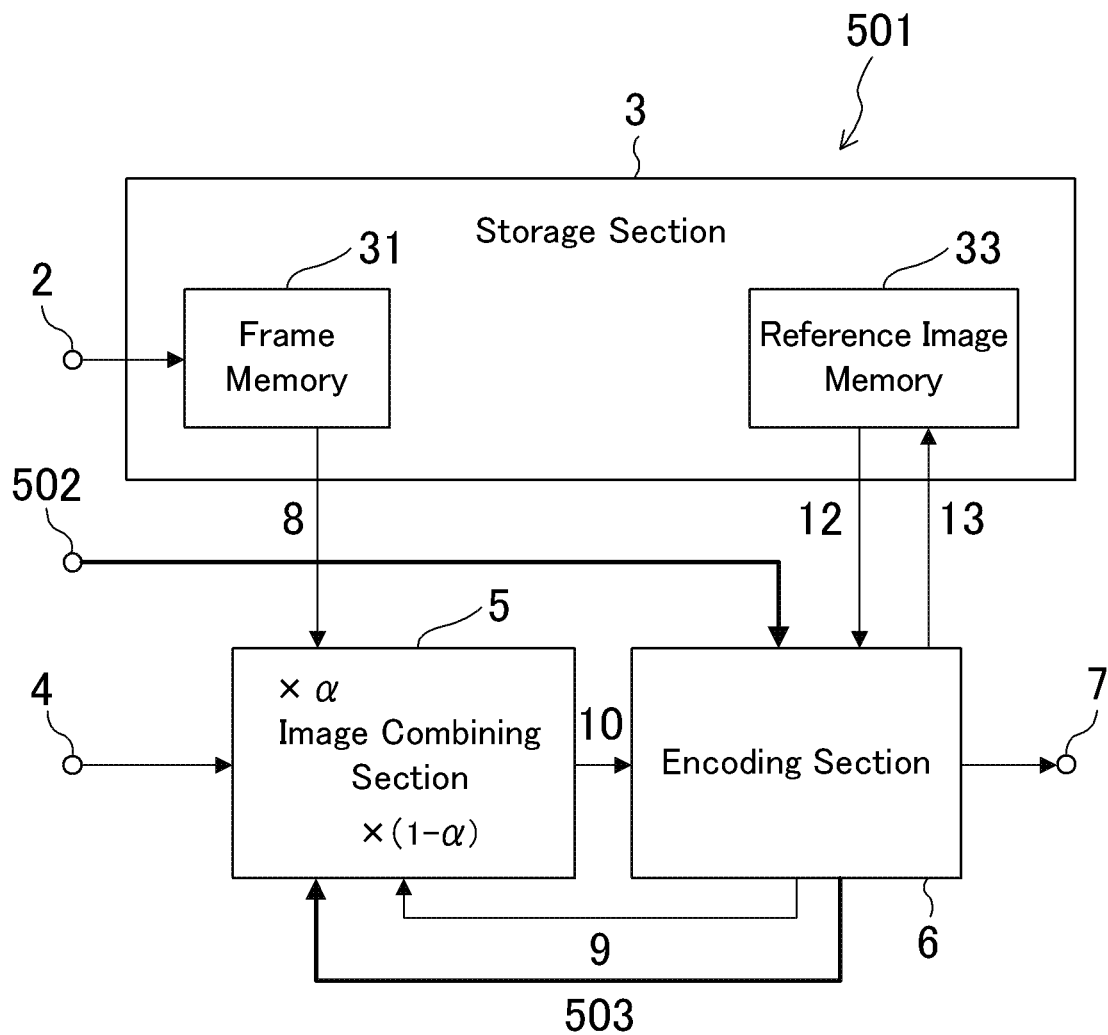
FIG. 9 is a diagram illustrating a configuration of an image combining and encoding device according to the fifth embodiment of the present invention.
Figure 10:
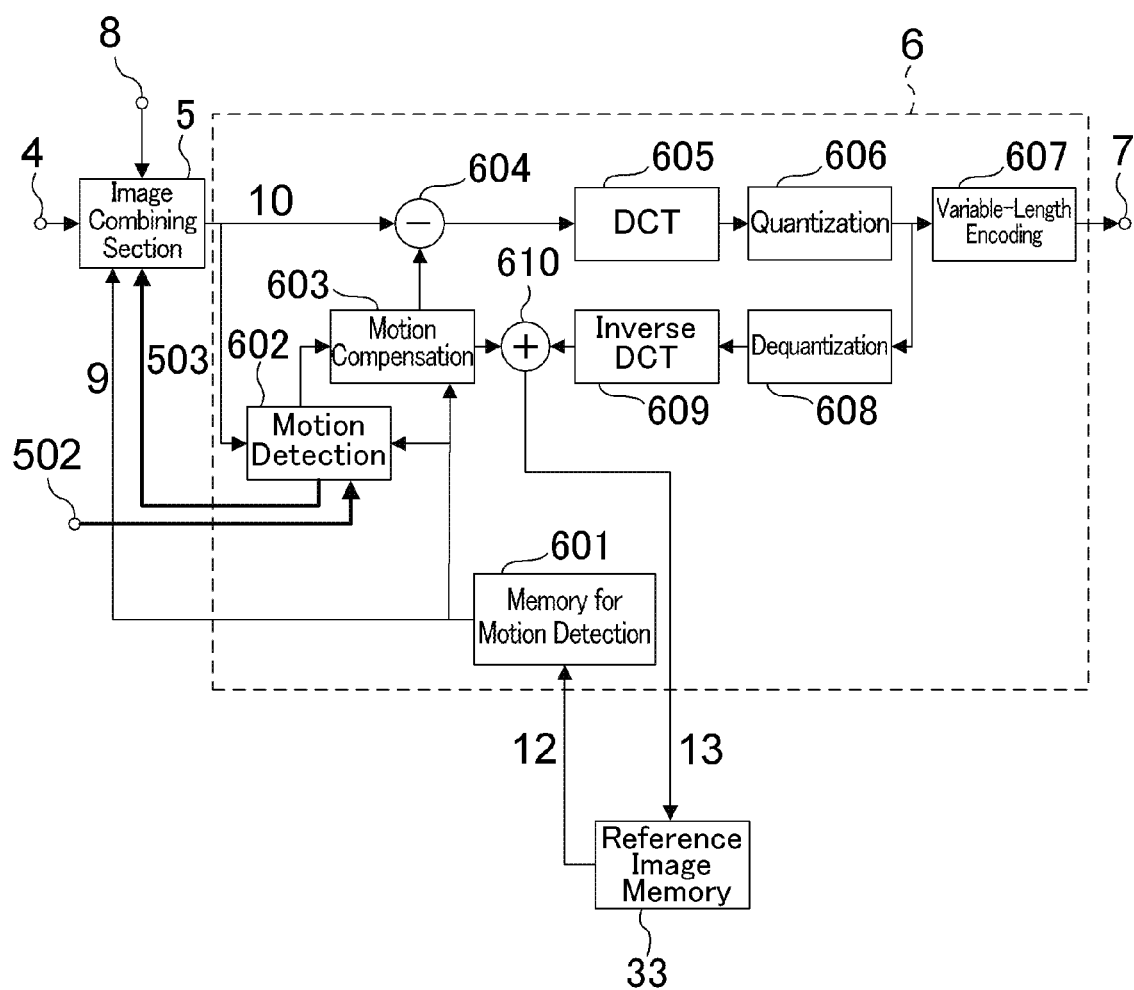
FIG. 10 is a diagram illustrating a configuration of the encoding section according to the fifth embodiment of the present invention.

FIG. 9 is a diagram illustrating a schematic configuration of an image combining and encoding device 501 according to the fifth embodiment of the present invention. FIG. 10 is a diagram schematically illustrating an internal configuration of the encoding section 6 shown in FIG. 9.

This embodiment is different from the first embodiment in that there is provided an external configuration terminal 502 which sets a threshold value needed for determining whether or not the current image contains motion against the previous image, and that the motion contained in the current image against the previous image is quantitatively calculated on a per macro-block basis in the encoding section 6; whether motion is contained or not is determined by comparing the threshold value set by the external configuration terminal 502 with the result of calculation; the determination result 503 is output to the image combining section 5; and the image combining section 5 controls whether or not to combine the current and the previous images based on the determination result 503.

In the first embodiment, the entire images are combined homogeneously at a preset composition ratio. Therefore, for example, in a region involving relatively large motion, such as a region within which a moving object moves (a region within which the trajectory is wanted to be tracked), there is no problem because image combining results in a recording process in which the trajectories are tracked. On the contrary, in a region in the background where there is little move, images are unnecessarily combined when the image contains only small motion, and thus a problem may arise in that a double image or a triple image occurs in an edge portion etc. of an image, thereby causing the image to appear visually displeasing.

Figure 11:
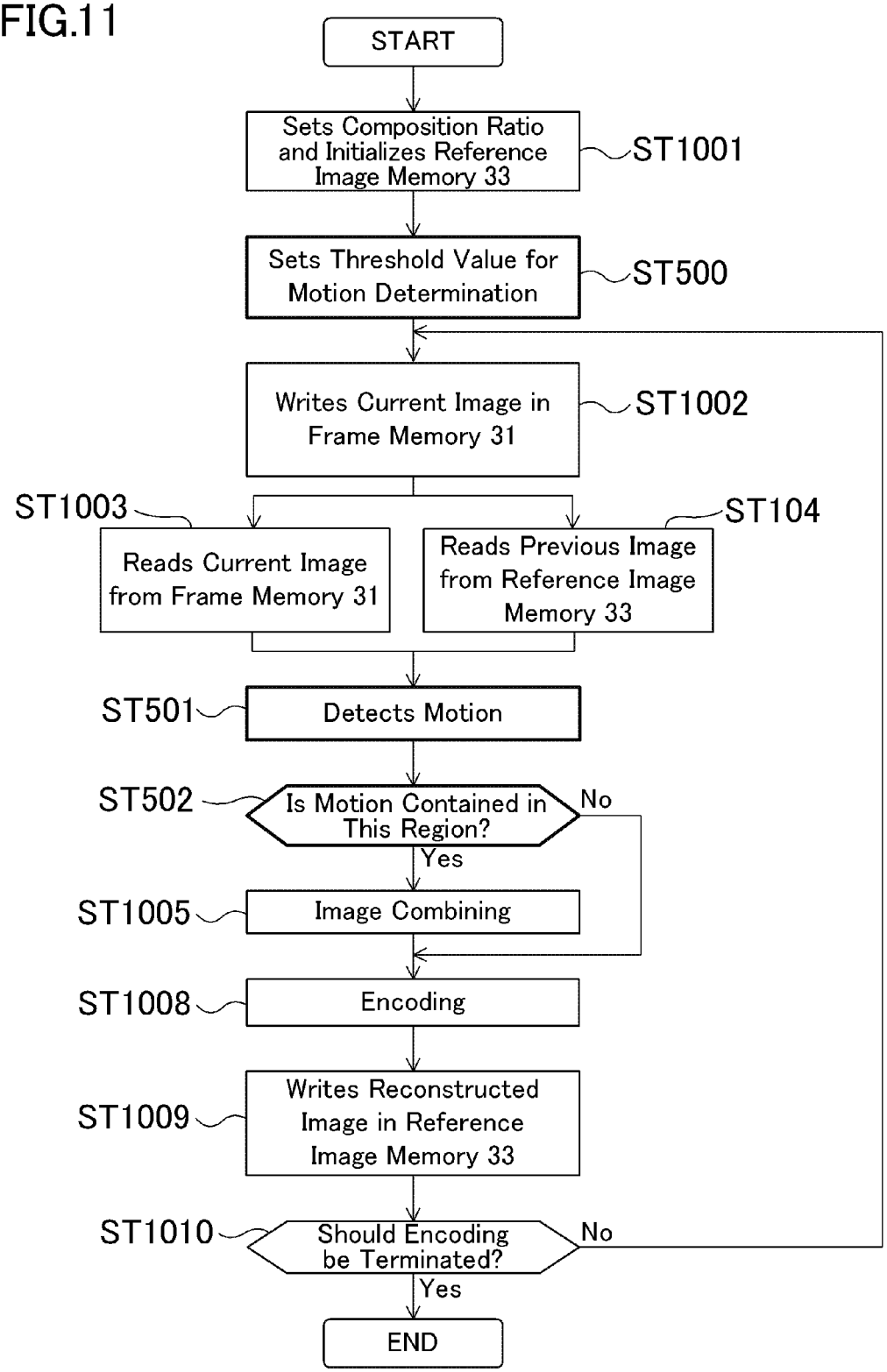
FIG. 11 is a flowchart showing a flow of the process of combining and encoding images according to the fifth embodiment of the present invention.

An object of the fifth embodiment is to solve such a problem. A detailed description thereof will be provided below using the flowchart of FIG. 11. Note that a detailed explanation is omitted for the steps to perform similar processes to those of the first embodiment.

The processing procedure of this embodiment is different from that of the first embodiment (FIG. 2) in that there are additional steps of setting a threshold value needed for determining whether or not the current image contains motion against the previous image (ST500), previously detecting motion contained in the current image against the previous image by a motion detection section 602 in the encoding section 6 before the current and the previous images are combined in the image combining section 5 (ST501), and determining whether or not to combine the current and the previous images based on the detection result (ST502).

At step ST1001, the composition ratio is set in the image combining section 5, and the reference image memory 33 is initialized. Then, at step ST500, a threshold value needed for determining whether or not the current image contains motion against the previous image is set from the external configuration terminal 502 (ST500). A minimum value of motion vector, a minimum value of sum of absolute differences (SAD), which represents a degree of correlation between the current and the previous images, etc. can be set as the threshold value.

Next, it is determined whether or not the current image sequentially read at step ST1003 contains motion against the previous image sequentially read at step ST104 (ST501).

Whether motion is contained or not is determined as follows: motion detection of the current image against the previous image is performed in the motion detection section 602 (ST501), and the motion vector value at a location where the degree of correlation is the highest is compared with the threshold value (the minimum value of motion vector) (ST502); if the motion vector value is equal to or greater than the threshold value, then the macro-block is determined to be "a region with motion" (Yes at ST502), thus the current and the previous images 8 and 9 are combined at step ST1005, and the composite image 10 is output to the encoding section 6 as the target image for encoding. Meanwhile, if the motion vector value is less than the threshold value, then the macro-block is determined to be "a region without motion" (No at ST502), thus the current image 8 is output to the encoding section 6 as the target image for encoding.

Although the process above has been described as determining whether a region contains motion or not by comparing the motion vector value at a location where the degree of correlation is the highest with a threshold value (the minimum value of motion vector), the determination on whether a region contains motion or not may be made by comparing the sum of absolute differences (SAD) between the current and the previous images at a location where the degree of correlation is the highest with a threshold value (the minimum value of SAD).

In addition, at step ST501, motion detection of the current image against the previous image may be performed using a widely known technique such as full search or OAT (one at a time). However, a simpler method of motion detection may be used such as only to calculate the sum of absolute differences (SAD) between the current image and the previous image (the magnitude of motion vector is zero) located at a same location in a two-dimensional space. This allows a motion detection process with a large amount of processing to be significantly simplified, and the time needed for executing the steps ST501 and ST502 to be significantly reduced, thus higher processing speed can be achieved.

Furthermore, while the process above has been described as setting only one threshold value needed for sequentially determining whether or not the current image contains motion against the previous image, multiple threshold values may be set, of course. In such a case, first at step ST1001, as many composite ratios as the number of threshold values are set, and then, at step ST500, the plurality of threshold values are set. For example, if three threshold values (TH1, TH2, and TH3) satisfying a relational equation TH1<TH2<TH3 are set, three composition ratios ($\alpha1$, $\alpha2$, and $\alpha3$) are also set. At step ST502, the motion vector value (or the sum of absolute differences) calculated at step ST501 is compared respectively with the plurality of threshold values (TH1, TH2, and TH3), and if the motion vector value<TH1, then the macro-block is determined to be "a region without motion" (No at ST502), and the current image 8 is output to the encoding section 6 as the target image for encoding. If TH1≤the motion vector value<TH2, then the macro-block is determined to be "a region with motion" (Yes at ST502), the current and the previous images 8 and 9 are combined at the composition ratio $\alpha1$ (ST1005), and the composite image 10 is output to the encoding section 6 as the target image for encoding. Similarly, if TH2≤the motion vector value<TH3, then the macro-block is also determined to be "a region with motion" (Yes at ST502), the current and the previous images 8 and 9 are combined at the composition ratio $\alpha2$ (ST1005), and the composite image 10 is output to the encoding section 6 as the target image for encoding. Moreover, if TH3≤the motion vector value, then the macro-block is also determined to be "a region with motion" (Yes at ST502), the current and the previous images 8 and 9 are combined at the composition ratio $\alpha3$ (ST1005), and the composite image 10 is output to the encoding section 6 as the target image for encoding.

Thus, according to the fifth embodiment, whether motion is contained or not is previously determined before the current and the previous images are sequentially combined; therefore, for example, in a region having a relatively large motion such as a region in which a moving object moves (a region in which the trajectory is wanted to be tracked), the process is controlled so that the images are combined as appropriate and the trajectory is drawn, whereas in a region such as the background where there is little move, the process is controlled so that images are not unnecessarily combined when the image contains only small motion. Therefore, the problem of multiple image in an edge portion etc. of an image can be minimized.

Sixth Embodiment

The sixth embodiment of the present invention is a variation of the first through fifth embodiments described above. This embodiment is different from the first through fifth embodiments in that the composition ratio set at step ST1001 is individually set for each of a luminance component (Y signal) and a chrominance component (C signal), and at step ST1005, the current and the previous images are combined using composition ratios respectively corresponding to the luminance component and the chrominance component.

In the first through fifth embodiments, the current and the previous images are combined using a common composition ratio for both the luminance component (Y signal) and the chrominance component (C signal). Therefore, if the chrominance component varies widely within an image, a problem arises in that the composite image appears visually displeasing.

On the contrary, in the sixth embodiment, the composition ratio is individually set for each of a luminance component (Y signal) and a chrominance component (C signal) at step ST1001. Specifically, the composition ratio for a chrominance component is set higher than the composition ratio for a luminance component. Such setting causes the current image to account for a greater portion in the composite image in the chrominance component than in the luminance component. Thus, previous trajectories of a moving object are likely to be faint. That is, by clearly drawing the previous trajectories for the luminance component, which contains much contour information etc. for an image, a visually preferable composite image can be obtained.

Seventh Embodiment

Figure 12:
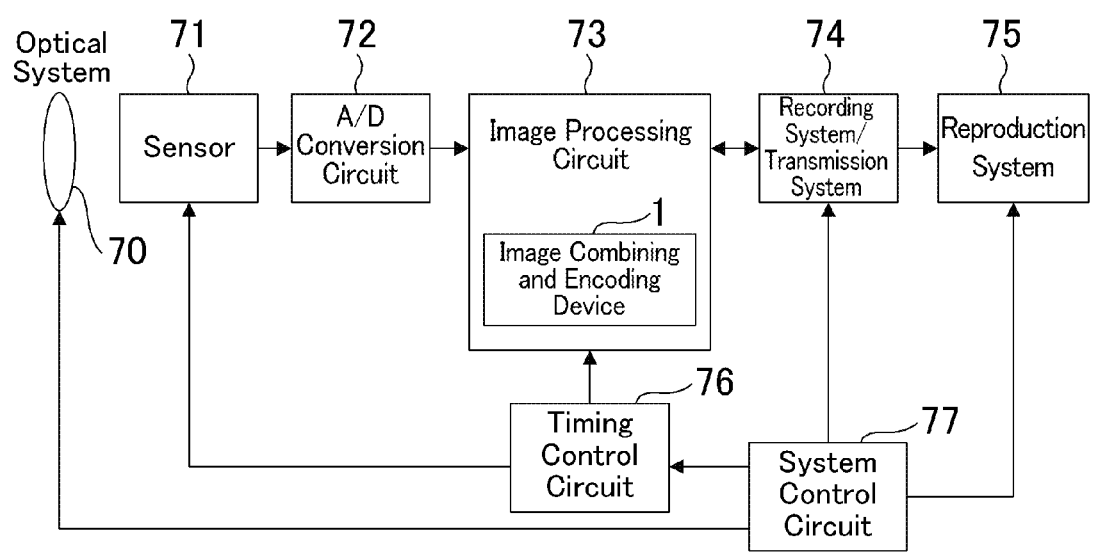
FIG. 12 is a diagram illustrating a configuration of an imaging system according to the seventh embodiment of the present invention.

FIG. 12 illustrates an imaging system (e.g., a digital still camera, a network camera, etc.) according to the seventh embodiment of the present invention. This imaging system utilizes any of the image combining and encoding methods described in the first through sixth embodiments.

In the imaging system of FIG. 12, image light input through an optical system 70 is focused on a sensor 71, and is photo-electrically converted. An electric signal generated by photo-electric conversion is converted to a digital value by an A/D conversion circuit 72, and then input to an image processing circuit 73. The image processing circuit 73 includes the image combining and encoding device 1 which utilizes any of the image combining and encoding methods described in the first through sixth embodiments. In the image processing circuit (image processing section) 73, Y/C processing, edge processing, image scaling, image compression and decompression of JPEG, MPEG, etc., control of a stream with compressed images, etc. are performed. The signal after image processing is recorded in a medium or is transmitted through Internet etc. by a recording system/transmission system 74. The recorded or transmitted signal is reproduced by a reproduction system 75. The sensor 71 and the image processing circuit 73 are controlled by a timing control circuit 76, and the optical system 70, the recording system/transmission system 74, the reproduction system 75, and the timing control circuit 76 are controlled by a system control circuit 77.

Although the imaging system shown in FIG. 12 has been described in terms of camera equipment etc. in which image light from the optical system 70 is photoelectrically converted in the sensor 71, and then input to the A/D conversion circuit 72, the present invention is not limited thereto. Of course, an analog video input signal from an A/V device such as a television set may be directly input to the A/D conversion circuit 72.

An image combining and encoding method and device according to the present invention uses the reference image used in the encoder also as the previous image in the image combiner, thereby allowing the storage capacity of the storage unit to be significantly reduced, and the number of accesses to the storage unit to be minimized; thus, the current and the previous images can be efficiently combined and encoded. Accordingly, the present invention is useful for monitoring cameras, network cameras, etc., including low-priced digital still cameras and movie cameras requiring high-speed and low power consumption encoding.

What is claimed is:

1. An image combining and encoding method, comprising:
    combining a current image and a previous image at a predetermined composition ratio on a per block basis, and generating a composite image;
    sequentially encoding moving pictures of the composite image generated in the combining;
    setting a threshold value needed for sequentially determining, on a predetermined per block basis, whether or not the current image contains motion against the previous image;
    previously detecting motion contained in the current image against the previous image before the current and the previous images are combined in the combining; and
    based on a result of a comparison between the detection result of the previously detecting and the threshold value,
        determining to combine the current and the previous images when the detection result of the previously detecting is equal to or greater than the threshold value, and
        determining not to combine the current and the previous images when the detection result of the previously detecting is less than the threshold value,
    wherein a reference image generated in the encoding is used as the previous image in the combining,
    if it is determined, in the determining, that combining is to be performed, the current and the previous images are combined at the predetermined composition ratio in the combining, while if it is determined that combining is not to be performed, the current and the previous images are not combined, but the current image is used as a target image for encoding in the encoding.

2. The image combining and encoding method of claim 1, wherein image data which are included in the reference image needed in the encoding and which are in a same location as that of the current image in a two-dimensional space are combined, as the previous image in the combining, with the current images at the predetermined composition ratio, and the combined composite image is encoded in the encoding.

3. The image combining and encoding method of claim 1, further comprising:
    presetting a region within which the current and the previous images are combined; and
    when sequentially combining the current and the previous images on a predetermined per block basis in the combining, determining whether or not a target block belongs to the region preset in the presetting,
    wherein if it is determined, in the determining, that the target block belongs to the region, the current and the previous images are combined at the predetermined composition ratio in the combining, while if it is determined that the target block does not belong to the region, the current and the previous images are not combined, but the current image is used as a target image for encoding in the encoding.

4. The image combining and encoding method of claim 3, wherein two of the composition ratios, which are a composition ratio inside a region and a composition ratio outside the region, are set in the combining, and if it is determined that the target block belongs to the region in the determining, the current and the previous images are combined at the composition ratio inside the region, while if it is determined that the target block does not belong to the region, the current and the previous images are combined at the composition ratio outside the region.

5. The image combining and encoding method of claim 1, wherein
    multiple ones of the composition ratio are set in the combining, and multiple ones of the threshold value are set in the setting,
    in the determining, an extent of motion is determined by comparing the motion detected in the previously detecting with each of the multiple ones of the threshold value, and whether or not to combine the current and the previous images is determined based on the extent of motion, and
    if it is determined, in the determining, that combining is to be performed, the current and the previous images are combined in the combining at a composition ratio, corresponding to the extent of motion, of the multiple ones of the composition ratio.

6. The image combining and encoding method of claim 1, wherein the threshold value set in the setting is a motion vector value.

7. The image combining and encoding method of claim 1, wherein the threshold value set in the setting is a sum of absolute differences, which represents a degree of correlation between the current and the previous images.

8. The image combining and encoding method of claim 1, wherein the previously detecting is performed in a motion detection process needed in the encoding.

9. The image combining and encoding method of claim 1, wherein the previously detecting is performed by using a simple motion-detection method in which a sum of absolute differences between the current image and the previous image located in a same location as the current image in a two-dimensional space is calculated.

10. The image combining and encoding method of claim 1, wherein the composition ratio set in the combining is individually set for each of a luminance component and a chrominance component.

11. The image combining and encoding method of claim 10, wherein the composition ratios are set so that the composition ratio for a chrominance component is higher than the composition ratio for a luminance component.

12. An imaging system, comprising:
an image processing circuit, including an image combining and encoding section which can perform the image combining and encoding method of claim 1, which performs image processing; and
a conversion circuit which converts an input analog image signal to a digital image signal, and outputs the digital image signal to the image processing circuit.

13. The imaging system of claim 12, further comprising:
a sensor; and
an optical system which focuses light onto the sensor,
wherein the sensor photoelectrically converts image light focused by the optical system into an electric signal, and outputs the electric signal to the conversion circuit.

* * * * *